United States Patent [19]

Johnston et al.

[11] 4,175,906
[45] Nov. 27, 1979

[54] VIBRATOR FOR DUMPING VEHICLE

[76] Inventors: William T. Johnston, 3214 Laubert Rd., Atwater, Ohio 44201; N. Glen Barker, 1010 Jefferson Ave., Alliance, Ohio 44601

[21] Appl. No.: 850,343

[22] Filed: Nov. 10, 1977

[51] Int. Cl.² .............................................. B60P 1/58
[52] U.S. Cl. .................................... 414/469; 298/1 V; 414/525
[58] Field of Search .................. 214/501, 505, 83.3, 214/64.2; 298/1 V, 23 MD, 23 M, 22 R; 74/87; 105/265, 271, 273, 276

[56] References Cited

U.S. PATENT DOCUMENTS

| | | | |
|---|---|---|---|
| 1,942,402 | 1/1934 | Anthony et al. | 298/1 V |
| 2,072,998 | 3/1937 | Allin | 298/23 MD X |
| 3,343,876 | 9/1967 | Rapp | 298/1 V |
| 3,438,677 | 4/1969 | Redpath | 298/1 V |

*Primary Examiner*—Albert J. Makay
*Attorney, Agent, or Firm*—Burns, Doane, Swecker & Mathis

[57] ABSTRACT

An automatically actuated hydraulically powered vibrator system for loosening the contents of a semi trailer dump body so that it will break away at its natural dumping angle. The semi trailer dump includes a hydraulic pump which delivers hydraulic fluid under pressure to extend a telescoping hydraulic cylinder to raise the dump body to a dumping position. An adjustable normally closed pressure relief valve is set to open when the pressure in the cylinder reaches a predetermined level corresponding to a dump body angle a few degrees less than the normal dumping angle for the commodity being dumped. When the valve opens, hydraulic fluid is pumped to a hydraulic motor which drives a vibrator which is bolted to the dump body. The vibrator loosens the material being dumped and prepares it to slide out of the body at its natural dumping angle. When slide-out begins, the fluid pressure in the cylinder drops, the valve closes and shuts off the hydraulic motor and vibrator, so that the material being dumped slides out of the dump body naturally.

9 Claims, 2 Drawing Figures

VIBRATOR FOR DUMPING VEHICLE

BACKGROUND OF THE INVENTION

This invention relates to semi trailer dump bodies and, more particularly, to apparatus for dumping the contents of the body.

A semi trailer dumping vehicle is a very versatile vehicle for transporting a large variety of different particulate material. Vehicles of this kind include a semi trailer dumping body having a chassis that is adapted to be supported at the front by a tractor and at the rear by wheels attached to the chassis. The dumping body typically is in the form of a box with a closed bottom, side walls and a front wall and an open top. A tailgate is mounted across the rear of the body to retain the contents of the body when the tailgate is closed. The box is pivotally mounted at the rear end of the chassis so that it may be raised into a dumping position by one or more hydraulically operated cylinders pivotally attached between the front end of the chassis and the front end of the box. During dumping, it is important that the contents slide smoothly and evenly out of the box through the unloading opening and past the tailgate onto the ground or into a waiting receptacle.

Different materials slide out at different angles depending upon the shape and texture of the particulate, the weight distribution and the condition of the floor of the dump body.

If the contents of the box is dry, homogeneous and properly distributed throughout a smooth, dry dumping body, dumping can be easily and smoothly accomplished. However, moisture distributed throughout the particulate material or on the surface of the dumping body may cause the particles to stick together and to stick to the insides of the dumping body. Even if the materials is dry when it is placed into the dumping body, it can become wet while it is being transported or stored in the dumping body. After a period of use, the inside of the body often becomes dented and rough so that it will tend to inhibit the easy slideout of the commodity.

Dumping wet or frozen materials from a rough dump body can be very difficult. The particles can tend to stick together past its natural angle and then release all at once and cascade toward the unloading opening. This tends to destabilize the raised body. If parts of the payload are frozen or otherwise stuck together, the load can get hung up on the tailgate. When this happens, it can be a serious problem to free the load. It may be difficult for an operator to climb up on the raised body and loosen the load with a shovel or even to stand on the ground next to the body and try to loosen the load from below. Operators sometimes try to lower and then raise the dump body quickly to jar the load loose. Operators have been known to attempt to drive the semi trailer away from the dumping spot with the dumping body raised in the hope that quickly acceleraing and then quickly stopping will jar the load loose.

It is also possible for one side of the load to slide before the other side. This can cause the raised dumping vehicle and the tractor to roll over, thus spilling the contents and damaging both the semi trailer dump body and tractor.

Even if destabilizing uneven breakaway does not occur, positions of the contents may stick to the insides of the dump body if it has not been properly loosened prior to dumping. Such practices as accelerating the vehicle and stopping it quickly with the dump body raised to cause the tailgate to bang against the back of the body or quickly reciprocating the cylinder hoist are usually not satisfactory ways to loosen the retained material. Manually removing the undumped contents is time consuming and thus expensive.

To alleviate this problem of the load sticking to the insides of the dump body or of the load sticking together, vibrators have been placed on the bottom of the truck body to vibrate the contents loose. Electrically driven vibrators have been used in the past which may be actuated by a switch located on the dashboard of a truck cab. See, for example, devices disclosed in U.S. Pat. Nos. 3,438,677, and 3,747,980. Other solutions have been provided for this problem by using an hydraulic vibrator mounted on the bottom of the dumping body and operated by the hydraulic fluid which drives the hoist to raise the dumping body. These devices have also been manually actuated by a control knob located on the dashboard of the cab. See, for example, U.S. Pat. No. 3,343,876. Although these devices provide adequate means for shaking a load loose, they are manually actuated and hence depend, for their proper operation, upon the skill of the operator. If the vibrator is turned on too soon before the dumping body reaches the normal dumping angle of the contents, the load will be compacted by the vibration and dumping will be made more difficult. If the vibrator is turned on after the dumping body reaches the normal dumping angle it can cause a sticking load to release too quickly and cascade out of the dumping body. This can destabilize the dumping body.

It can be undesirable to have the vibrator remain on too long after the contents have begun to slide out. It is important that the contents begin to slide out at the proper angle and that it be allowed to slide out naturally at its own pace. Vibrating the load too heavily while it is sliding, can tend to accelerate the sliding and also, perhaps, destabilize the raised vehicle.

SUMMARY OF THE INVENTION

The present invention provides an apparatus for dumping a mass of particulate material from a dumping body of a vehicle. The apparatus includes a source of hydraulic fluid under pressure for driving an expansible hydraulic cylinder to lift the forward end of the body relative to the chassis of the vehicle. A vibrator is provided on the dump body and is driven by an hydraulic motor to vibrate the body and facilitate the dumping of the particulate material. A valve which is responsive to the pressure of the hydraulic fluid in the cylinder is used to actuate the motor and the vibrator. When the pressure of the hydraulic fluid in the cylinder exceeds a predetermined pressure level the valve opens and starts the motor and the vibrator. When the pressure of the hydraulic fluid in the cylinder drops below the predetermined level the valve closes and shuts off the motor and the vibrator.

The present invention also provides a method for dumping particulate material from a dumping body of a vehicle. Different particulate materials have different dumping angles. The pressure of the hydraulic fluid in the cylinder increases as the dump body is raised toward the natural dumping angle of the contents of the body. The pressure in the cylinder corresponding to the normal dumping angle of the particulate material being dumped can be determined. A portion of the hydraulic fluid used to expand the cylinder can be diverted to an hydraulic control circuit for the vibrator which includes a pressure relief valve and an hydraulic motor. The valve is set to open at a pressure of the fluid in the cylinder corresponding to a dump body angle a few degrees less than the normal dumping angle. When the pressure of the fluid in the cylinder reaches the set pressure of the valve, the valve will open, permitting hydraulic fluid to flow through the hydraulic motor so that the motor can operate the vibrator. The vibrator will loosen the particulate material to prepare it for natural slideout. As the body reaches the natural dumping angle the contents will begin to slide out, the back force on the cylinder will drop, thus the pressure of the fluid in the cylinder will drop and the valve will close, turn off the flow of hydraulic fluid to the motor and stop the vibrator.

DESCRIPTION OF THE DRAWINGS

The invention will be more fully understood and its advantages more fully appreciated from the following detailed description taken in conjunction with the accompanying drawings in which.

DESCRIPTION OF THE PREFERRED EMBODIMENT

Figure 1:
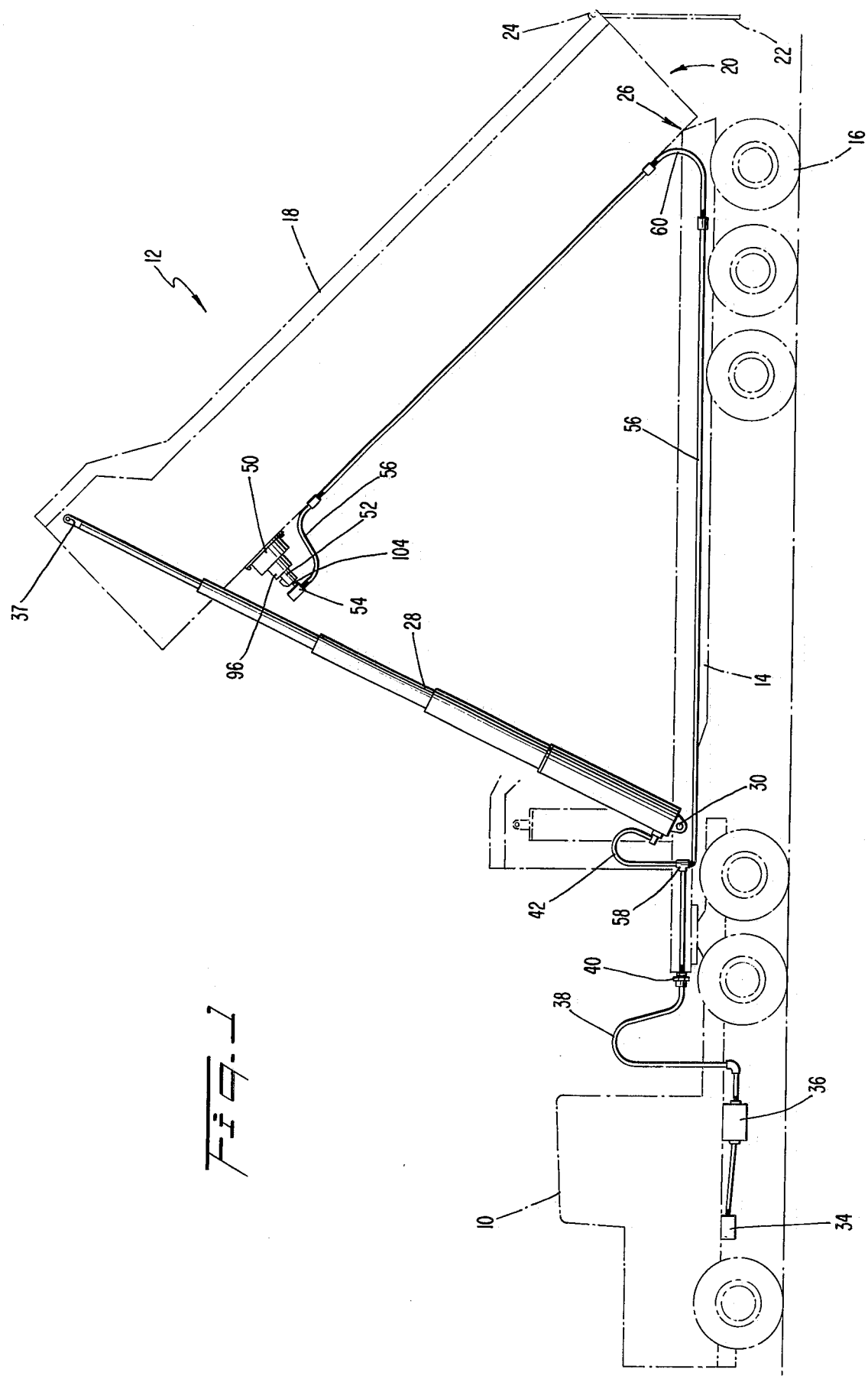
FIG. 1 illustrates the hydraulic system of the present invention disposed upon its typical tractor, semi dump trailer combination.

Referring now to FIG. 1 there is shown a typical dumping vehicle having a tractor 10 and a semi trailer dump 12 whose chassis 14 is connected to the back of the tractor 10. The rear end of the chassis 14 is supported by its own wheels 16. The dump body 18 is a large, generally rectangular box having an unloading opening 20 at its rear end across which is suspended a tailgate 22 by means of hinges 24 supported from the top of the sides of the dump body 18. Alternatively, the tailgate 22 may be pivotably connected across the unloading opening 20 from the bottom of the dump body 18. The back of the dump body 18 is pivotably connected to the back of the chassis 14 at an axis 26. The dump body 18 is tipped up into dumping position by means of a telescoping hydraulic cylinder 28, the lower end 30 of which is pivotably connected near the front of the chassis 14 and the upper end 32 of which is pivotably connected near the front of the dump body 18.

A power takeoff transmission 34 is disposed on the tractor 10 and may be engaged by the operator by moving a lever in the cab. An hydraulic pump 36 which is driven by the tractor engine (not shown) through a power takeoff 34, pumps hydraulic fluid through high pressure hydraulic piping 38 into the hydraulic cylinder 28 to raise the body 18. A coupling 40 is provided in the piping 38 so that the semi trailer dump 12 may be conveniently disconnected from the tractor 10. A vibrator 50 is bolted to the bottom of the dump body 18 at a point near the front of the dump body. The bolting provides a rigid connection between the vibrator housing and the dump body 18 so that when the vibrator 50 is actuated, it will vibrate the dump body 18 and loosen the contents to prepare it for safe and easy breakaway. As will be discussed more fully in connection with FIG. 2, an hydraulic motor 52 is mounted on the vibrator 50 for driving the vibrator. A pressure relief valve 54 is mounted on the outside of the hydraulic motor 52 for switching the motor on and off at predetermined pressure levels.

Referring again to FIG. 1, a second high pressure hydraulic line 56 connects the pressure relief valve 54 to the hydraulic line 38 at a point 58 upstream of the hydraulic cylinder 28. This can be a T-connection. The hydraulic line 56 extends horizontally along the chassis 14 and along the body 18 parallel to the bottom of the body. A flexible portion 60 of the line 56 is provided so that the line 56 can accommodate the motion of the dump body 18 with respect to the chassis 14 without breaking. Suitable return lines (not shown) are provided from the hydraulic motor 50 to a hydraulic fluid reservoir (not shown) to complete the hydraulic circuit.

The pressure valve 54 is preferably a relief valve of the kind sold by Sun Hydraulic Corp., of Sarasota, Florida, under part no. RPGC CED, but other valves could be used. The hydraulic motor 52 is preferably a 1¼ gallons per minute hydraulic motor of the kind made by Delta Power Hydraulic Co., Rockville, Illinois, and sold under part DM-2 or DM-4, but other hydraulic motors could be used.

Figure 2:
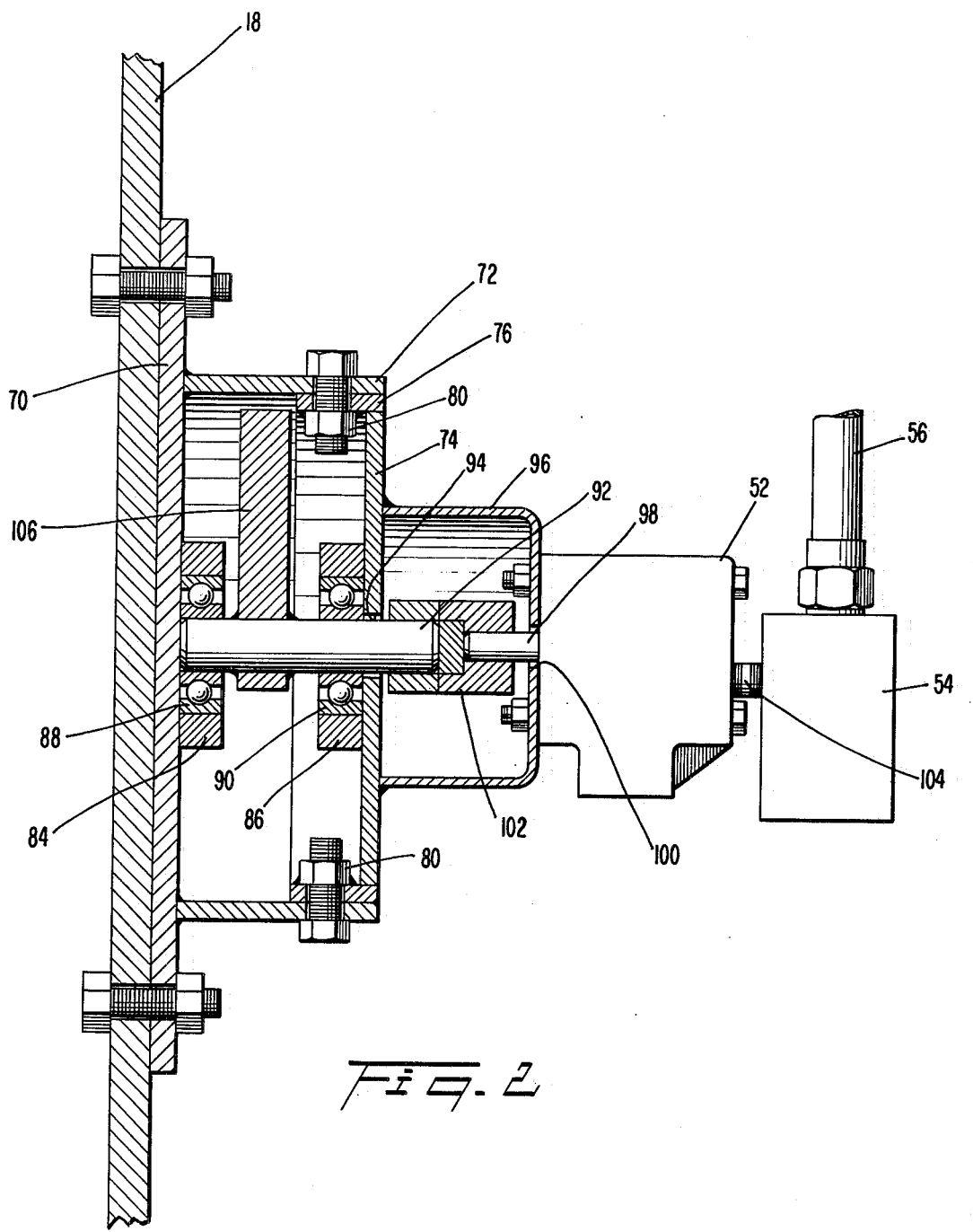
FIG. 2 shows a partially cut-away side view of the vibrator, hydraulic motor and pressure valve of the present invention.

Referring now to FIG. 2, there is shown a side view partially in section of the vibrator 50 and its associated hydraulic motor 52 and the normally closed pressure relief valve 54. The vibrator 50 includes a plate 70 which may be bolted directly to the bottom of the dump body 18 and a generally cylindrical housing 72 with its center line aligned perpendicular to the plane of the plate 70. The end of the housing 72 remote from the plate 70 is open and is covered by a circular housing cover 74 having a peripheral flange 76. The housing cover 74 is secured over the housing 72 by bolts 78 which pass through holes aligned on the remote end of the housing 72 and the flange 76. Bolts 78 are secured by means of nuts 80 which are welded to the inside of flange 76. Alternatively the holes in flange 76 through which bolts 78 project may be tapped to hold bolts 78.

Bearing blocks 84 and 86 are centrally disposed on the inside surfaces of plate 70 and the housing cover 74. Roller bearings 88 and 90 are disposed in the bearing blocks 84 and 86. A shaft 92 is disposed in the bearings 88, 90 and one end projects through an opening 94 in the center of the housing cover 74.

A generally rectangular or square coupling housing 96 is welded to the housing 74 and centrally disposed about the opening 94. The hydraulic motor 52 is bolted to the top of the coupling housing 96. The drive shaft 98 of the hydraulic motor 52 projects into the coupling housing 96 through a centrally disposed opening 100 in the coupling housing 96. The vibrator shaft 92 also projects into the coupling housing 96 and is coupled to the hydraulic motor shaft 98 by means of a coupling 102.

The pressure valve 54 is secured to the hydraulic motor 52 by means of a fluid coupling 104.

Supported on the vibrator shaft 92 is an eccentric weight 106 which rotates in the housing 72. An eccentric weight 106 is in the shape of a sector of a circle welded to its shaft 92.

In operation, the dump body 18 is filled with its payload. The weight per cubic yard of the particulate material, the cubic yard capacity of the dump body 18, the slideout angle for the material being carried and the legal payload under both federal and state laws are all known quantities. For a particular type of hydraulic cylinder 28, the hydraulic pressure required to raise the dump body 18 to the slideout angle of the particular material being carried can be calculated. The adjustable normally closed pressure relief valve 54 will be set to open and start the hydraulic motor 52 and correspondingly start the vibrator 50 into operation at a pressure which corresponds to an angle of tilt of the body 18 a few degrees less than the slideout angle for the particular material being hauled. When the vibrator 50 turns on, it prepares the particulate material for dumping at its slideout angle by insuring that the material is in a particulate form and that large numbers of individual pieces of the material are not stuck together by moisture or ice or otherwise.

After the pressure valve has been set, the power take-off 34 is engaged by the operator to start the hydraulic pump 36 operating and to pump hydraulic fluid through the hydraulic lines 38, the coupling 40, the flexible section 42 into the hydraulic cylinder 28. As the pressurized hydraulic fluid is delivered to the cylinder 28, the cylinder begins to extend and raise the dump body 18. As the telescoping cylinder 28 extends and the dump body is raised, the stage of the telescoping cylinder 28 gets smaller and hence the pressure of the hydraulic fluid in the cylinder increases as the dump body is raised. Pressurized hydraulic fluid is also delivered to the secondary hydraulic line 56 through the T-joint 58 to the pressure relief valve 54. The pressure relief valve 54 stays closed until the hydraulic pressure of the fluid inside the cylinder 28 reaches the preset value on the valve 54. The valve 54 then opens and permits hydraulic fluid to flow under pressure to the hydraulic motor 52 and the drive vibrator 50. This vibrates the dump body 18 and loosens the contents to prepare it for dumping at its natural dumping angle without sticking. As soon as the contents begins to dump, the pressure in the cylinder 28 and correspondingly in the line 56 drops so that the pressure relief valve 54 closes, turns off the hydraulic motor 52 and stops the vibrator 50. This permits the contents to dump from the body 18 naturally without being accelerated by the continued vibration of the vibrator 50 after natural slideout has begun.

The operation of the present invention will be more easily understood from the following specific example.

EXAMPLE 1

A forty cubic yard trailer dump body was filled with soft coal having a weight of 1400 pounds per cubic yard giving a total payload of 56,000 pounds. The legal payload limit for soft coal in the state of Ohio where the test was conducted, is 80,000 pounds gross weight under both federal and state law. The natural slideout angle for soft coal is 40°. The soft coal was dumped at a power plant during freezing weather conditions. The normally closed pressure relief valve 54 was set by the operator to open automatically at a pressure corresponding to a dump body angle of 38°. The pressure relief valve was made by Sun Hydraulic Corp., of Sarasota, Florida and sold under part number RPGC CED. The hydraulic motor 52 was built by Delta Power Hydraulic Co., of Rockville, Illinois, and sold under past number DM-2 or DM-4 and had a capacity of 1¼ gallons per minute. The vibrator 40 had a vibration rate of 1500 to 2000 vibrations per minute. The hydraulic pump 36 had a capacity of approximately 36 gallons per minute. The hydraulic cylinder 28 was a five-stage telescoping cylinder which extends to 235 inches. The hydraulic cylinder 28 extends, the pressure increases in proportion to the angular position of the dump body. We found that the frozen coal was vibrated loose and that the coal dumped freely and evenly from the dump body 18 at its natural slideout angle of 40°. As the coal started to slide, the pressure valve 54 shut off the flow to the vibrator thus permitting the coal to slide out naturally.

It can be seen that this automatically actuated vibrator turns on at a predetermined pressure corresponding to a point just prior to the natural dumping angle for the commodity being dumped. This vibrates and loosens the load to prepare it for dumping when the normal dumping angle is reached. After dumping begins the vibration shuts off automatically so that the normal dumping of the load will not be accelerated. This eliminates the need for an operator to judge the correct point at which to turn on the vibrator and provides a safer and more reliable dump body.

If the operator knows the weight per cubic yard of the material being hauled, the legal payload for that material, the cubic yard capacity of the semi trailer dump body being used, the proper slideout angle for that material and the hydraulic pressure that will be experienced by the hydraulic cylinder in lifting that payload to that slideout angle, the pressure relief valve can be set at a pressure lower than the pressure to raise the payload to the dumping angle so that the vibrator will turn on just before dumping.

It can be seen that the present invention provides a method and apparatus for preparing a load for dumping at its natural dumping angle by automatically starting and stopping a vibrator at just the right point. The present invention adds versatility to the semi trailer dump body by allowing it to be used to haul materials that normally would not be hauled because of slideout conditions.

It will be apparent to those skilled in the art that various modifications may be made to the preferred embodiment of the invention disclosed above without departing from the scope of the invention. It is therefore intended that our invention not be limited except as in the appended claims.

What is claimed is:

1. Apparatus for dumping a mass of particulate material from a dumping body or a vehicle comprising:
    a source of hydraulic fluid under pressure;
    expansible hydraulic cylinder means on said vehicle in fluid communication with said source for lifting the forward end of said body relative to the chassis of the vehicle;
    vibrator means on said body including hydraulic motor means for driving a vibrator to vibrate said dumping body; and
    a valve means, in fluid communication between said source and said motor means, for actuating said motor means in response to the pressure of the hydraulic fluid in said cylinder means and adapted to open and start said motor means when the pressure in said cylinder means exceeds a predetermined pressure level and to close and stop said motor means when the pressure in said cylinder means drops below said level.

2. The apparatus of claim 1 wherein said vibrator includes an eccentric weight, said motor means driving said vibrator in the range of 1500 to 2000 revolutions per minute.

3. The apparatus of claim 1 wherein said valve means is a normally closed pressure relief valve.

4. The apparatus of claim 1 wherein said vibrator includes an eccentric weight mounted for rotation on a shaft driven by said hydraulic motor.

5. The apparatus of claim 1 wherein said predetermined pressure corresponds to a dump body position between the natural dumping position for the material in the body and a position such that actuating the vibrator will not significantly compact the material in the body.

6. The apparatus of claim 1 wherein said valve is adjustable to vary said predetermined pressure.

7. A method for dumping particulate material from an hydraulically actuated dumping body of a semi trailer dump vehicle having an expansible hydraulic cylinder means for raising the body toward a dumping angle; an hydraulic pump for delivering hydraulic fluid under pressure to said cylinder means and a vibrating means affixed to said body and adapted to produce vibrations in said body to facilitate the dumping of the material comprising the steps of:
  determining the natural dumping angle of the material being dumped;
  determining the pressure of said hydraulic fluid in said cylinder means at a point where said cylinder means has raised said body to the natural dumping angle of the material being dumped;
  delivering hydraulic fluid under pressure to said cylinder means to raise said dumping body toward the natural dumping angle for said material;
  diverting a portion of said hydraulic fluid to a hydraulic control circuit for said vibrator;
  sensing the pressure of said hydraulic fluid in said circuit;
  applying said sensed pressure to open a valve means in said hydraulic circuit at a predetermined pressure level corresponding to a dump body angle between said natural dumping angle and a body angle such that actuating the vibrator will not significantly compact the material being dumped;
  directing hydraulic fluid through said opened valve means to an hydraulic motor adapted to drive said vibrator when said valve opens; and
  closing said valve means when the pressure of said hydraulic fluid in said cylinder means drops below said predetermined pressure level to stop said motor and vibrator.

8. In a dumping vehicle having a dumping body, an expansible cylinder means for raising said dump body to a dumping position, an hydraulic pump for delivering hydraulic fluid under pressure to said cylinder means and a vibrator means affixed to said dump body, an hydraulic control circuit for automatically actuating said vibrator to prepare the contents of said dumping body for dumping at its natural dumping angle, comprising:
  a valve responsive to the pressure of the hydraulic fluid in said cylinder means and adapted to open when the pressure in said cylinder means exceeds a predetermined pressure level and to close when the pressure in said cylinder means drops below said level; and
  an hydraulic motor actuated by said valve for driving said vibrator to vibrate said dumping body to facilitate the dumping of the contents thereof.

9. The apparatus of claim 1 further including:
  a first conduit means for conducting fluid under pressure between said fluid source and said cylinder means; and
  a second conduit means for conducting fluid under pressure between said first conduit means and said motor means, said valves means being in said second conduit means between said first conduit means and said motor means.

* * * * *